US008775067B2

(12) United States Patent
Cho (10) Patent No.: US 8,775,067 B2
(45) Date of Patent: Jul. 8, 2014

(54) NAVIGATION SERVICE SYSTEM AND METHOD USING MOBILE DEVICE (75) Inventor: Dae Hee Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 626 days.

(21) Appl. No.: 12/500,555

(22) Filed: Jul. 9, 2009

(65) Prior Publication Data
US 2010/0010738 A1    Jan. 14, 2010

(30) Foreign Application Priority Data

Jul. 11, 2008 (KR) .................. 10-2008-0067753

(51) Int. Cl.
G08G 1/096866 (2006.01)

(52) U.S. Cl.
USPC ........... 701/410; 701/533; 701/468; 709/203; 345/173; 455/566; 707/769

(58) Field of Classification Search
USPC ......... 701/200, 207, 208, 215, 400, 410, 408, 701/409, 532, 533, 468, 431, 438; 455/566, 455/412.2, 550.1; 715/835, 863; 345/173, 345/168, 169; 709/203; 707/769, 770
See application file for complete search history.

(56) References Cited

U.S. PATENT DOCUMENTS

| 6,163,749 A | 12/2000 | McDonough et al. | |
| 7,940,250 B2 * | 5/2011 | Forstall | ........................ 345/173 |
| 2004/0064245 A1 | 4/2004 | Knockeart et al. | |
| 2004/0203903 A1 * | 10/2004 | Wilson et al. | .............. 455/456.1 |
| 2007/0220449 A1 | 9/2007 | Lee | |
| 2008/0055273 A1 * | 3/2008 | Forstall | ........................ 345/173 |
| 2008/0082930 A1 * | 4/2008 | Omernick et al. | ............ 715/765 |
| 2008/0114543 A1 | 5/2008 | Vishnu | |
| 2008/0122796 A1 * | 5/2008 | Jobs et al. | ...................... 345/173 |
| 2009/0017872 A1 * | 1/2009 | Myers et al. | .................. 455/566 |
| 2009/0125228 A1 * | 5/2009 | Dicke et al. | ................... 701/201 |

FOREIGN PATENT DOCUMENTS

| EP | 1 251 335 A2 | 10/2002 |
| KR | 10-2004-0098714 A | 11/2004 |
| KR | 10-2007-0093585 A | 9/2007 |

* cited by examiner

Primary Examiner — Ronnie Mancho
(74) Attorney, Agent, or Firm — Jefferson IP Law, LLP (57) ABSTRACT A navigation service system and a navigation service method are provided. The navigation service system includes a mobile device, and a web server for communicating with the mobile device, the mobile device includes a display unit for displaying at least one navigation widget icon, a wireless communication unit for executing wireless communications with the web server, a Global Positioning System (GPS) module for receiving location information of the mobile device, a memory unit for storing a navigation widget, and a navigation widget controller for controlling the wireless communication unit to transmit the location information of the mobile device to the web server, for controlling the wireless communication unit to receive map data related to the location information from the web server, and for controlling the display unit to display the map data and the location information.

16 Claims, 7 Drawing Sheets

NAVIGATION SERVICE SYSTEM AND METHOD USING MOBILE DEVICE

PRIORITY

This application claims the benefit under 35 U.S.C. §119 (a) of a Korean patent application filed in the Korean Intellectual Property Office on Jul. 11, 2008 and assigned Serial No. 10-2008-0067753, the entire disclosure of which is hereby incorporated by reference.

BACKGROUND OF THE INVENTION

1. Field of the Invention

The present invention relates to mobile device technology. More particularly, the present invention relates to a navigation service system and method using a mobile device equipped with a navigation widget.

2. Description of the Related Art

A mobile device, also known as a portable device, a handheld device and the like, is a pocket-sized computing device typically having a display screen with touch input or a miniature keyboard (often referred to as a keypad). Many different types of mobile devices, such as a mobile communication device, a Personal Digital Assistant (PDA) and a smart phone, are widely used today. Such mobile devices not only provide a voice call, a video call, and a Short Message Service (SMS), but also offer a variety of useful applications (e.g., a schedule manager, games and the like). More particularly, some recently launched portable devices have a navigation function that provides travel or traffic guide path based on location information.

A conventional navigation service system using a mobile device has an embedded map that has already been stored in the device. Therefore, when a navigation service is activated, the mobile device retrieves map data in connection with current location information from its own storage and displays retrieved map data on a screen.

The quantity of such map data is large, so the mobile device needs a large storage capacity to store the map data. Also, since map data should be updated frequently to reflect the newest data, a user often suffers great inconvenience in use. In addition, in order to use a navigation service system in foreign countries, a user has to additionally download map data related to those countries.

Furthermore, a conventional navigation service system uses limited map data provided by a navigation service provider or a mobile device manufacturer. Therefore, a user is restricted in selection of map data and has difficulty in reflecting desired map data to a navigation service system.

Moreover, a navigation program used in a conventional navigation service system has a slower loading time because of its large size and requires a large amount of resource for running.

Therefore, a need exists for an improved navigation service technology that requires no embedded map, allows a user to reflect desired map data, and reduces a loading time.

SUMMARY OF THE INVENTION

An aspect of the present invention is to address at least the above-mentioned problems and/or disadvantages and to provide at least the advantages described below. Accordingly, an aspect of the present invention is to provide a navigation service system and a navigation service method using a mobile device.

In accordance with an aspect of the present invention, a navigation service system is provided. The system includes a mobile device, and a web server for communicating with the mobile device, the mobile device includes a display unit for displaying at least one navigation widget icon, a wireless communication unit for executing wireless communications with the web server, a Global Positioning System (GPS) module for receiving location information of the mobile device, a memory unit for storing a navigation widget, and a navigation widget controller for controlling the wireless communication unit to transmit the location information of the mobile device to the web server, for controlling the wireless communication unit to receive map data related to the location information from the web server, and for controlling the display unit to display the map data and the location information.

In accordance with another aspect of the present invention, a navigation service method using a mobile device which includes a GPS module, a navigation widget controller, a wireless communication unit and a display unit is provided. The method includes receiving location information of the mobile device through the GPS module controlled by the navigation widget controller, transmitting the location information to a web server through the wireless communication unit controlled by the navigation widget controller, receiving map data related to the location information from the web server through the wireless communication unit controlled by the navigation widget controller, and displaying the map data and the location information on the display unit controlled by the navigation widget controller.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In exemplary embodiments of the present invention, a widget denotes a customized application that allows a user to edit a standby screen with mainly used contents and to directly activate desired services (e.g., a clock, weather, a search, a calendar, a schedule, stock and the like) without accessing related web sites. Depending on types and features of target services, a widget may be formed in a variety of manners, such as a Java Script, an Extensible Markup Language (XML), or an Open Application Programming Interface (API). Since the widget may be activated in a standby screen, the widget has an advantage of a faster loading time over typical applications.

In the exemplary embodiments of the present invention, a navigation widget denotes a specific widget configured suitably for a navigation service. A navigation widget may be formed by using the Open API related to map data that a web server provides. Also, a navigation widget may include instructions for a wireless communication unit in a mobile device to receive a list of candidate destinations and related map data from a web server. A navigation widget may further include instructions for a Global Positioning System (GPS) module in a mobile device to receive location information of the device from a GPS satellite. A navigation widget may still further include instructions for a display unit in a mobile device to display a location of the device on a map. A navigation widget may be redesigned to reflect a user's desired map to a navigation service system.

In the exemplary embodiments of the present invention, a navigation widget controller may be included in a control unit of a mobile device and performs control functions for entire operations, e.g., activation of a navigation widget, of a navigation service system. A navigation widget controller controls a wireless communication unit to transmit location information of a mobile device to a web server and to receive map data in response to location information from a web server. A navigation widget controller then controls a display unit to display a device location on a map. Additionally, a navigation widget controller controls a wireless communication unit to transmit a destination search keyword to a web server, to receive a list of candidate destinations in response to a destination search keyword from a web server, to transmit a selected destination in a list to a web server, and to receive map data in response to a selected destination. Also, a navigation widget controller controls a display unit to display a device location on a map.

In the exemplary embodiments of the present invention, a navigation widget icon denotes a graphical object arranged in a standby screen to allow execution of a navigation service system. That is, by touching a navigation widget icon (if a mobile device has a touch screen) or selecting a navigation widget icon through key input (if a mobile device has a Liquid Crystal Display (LCD)), a user may execute a navigation service system. If a navigation widget is embedded in a mobile device, a navigation widget icon may appear in a standby screen through a user's menu selection. If a navigation widget is downloaded from a web server, a navigation widget icon may appear in a standby screen automatically or through a user's menu selection.

The GPS, also known as a global navigation satellite system, is often used for navigation purposes. The GPS uses a constellation of satellites that transmit precise microwave signals, which allow GPS receivers to determine their current location. In an exemplary implementation, a GPS module in a mobile device has a GPS receiver communicating with GPS satellites to track the current location of the device.

The Open API denotes a user-friendly open interface that web service providers open access ways to the public for specific functions or content services. While a traditional API denotes languages or messages used for communication between an Operating System (OS) and applications, the Open API denotes languages or messages used for communication between web servers. As new programs are developed by using API, it is also possible to develop new services by using the Open API. A number of web servers (e.g., GOOGLE, EBAY, YAHOO, NAVER and the like) currently provide a variety of the Open APIs, and also some web servers offer the Open API related to map data. In an exemplary implementation, a mobile device may utilize destination data and map data, stored in a web server, by using the Open API that a web server provides. Additionally, a user may redesign a navigation widget by using suitable Open APIs various web servers provide.

A web server is a server that provides web pages (i.e., HyperText Markup Language (HTML) files). A web server has a specific domain name and may be equipped with a web server program capable of serving web pages using HyperText Transfer Protocol (HTTP). In an exemplary implementation, a web server provides map data and a list of candidate destinations to a mobile device. Also, a web server provides the Open API for easier access to the web server from a mobile device.

Figure 1:
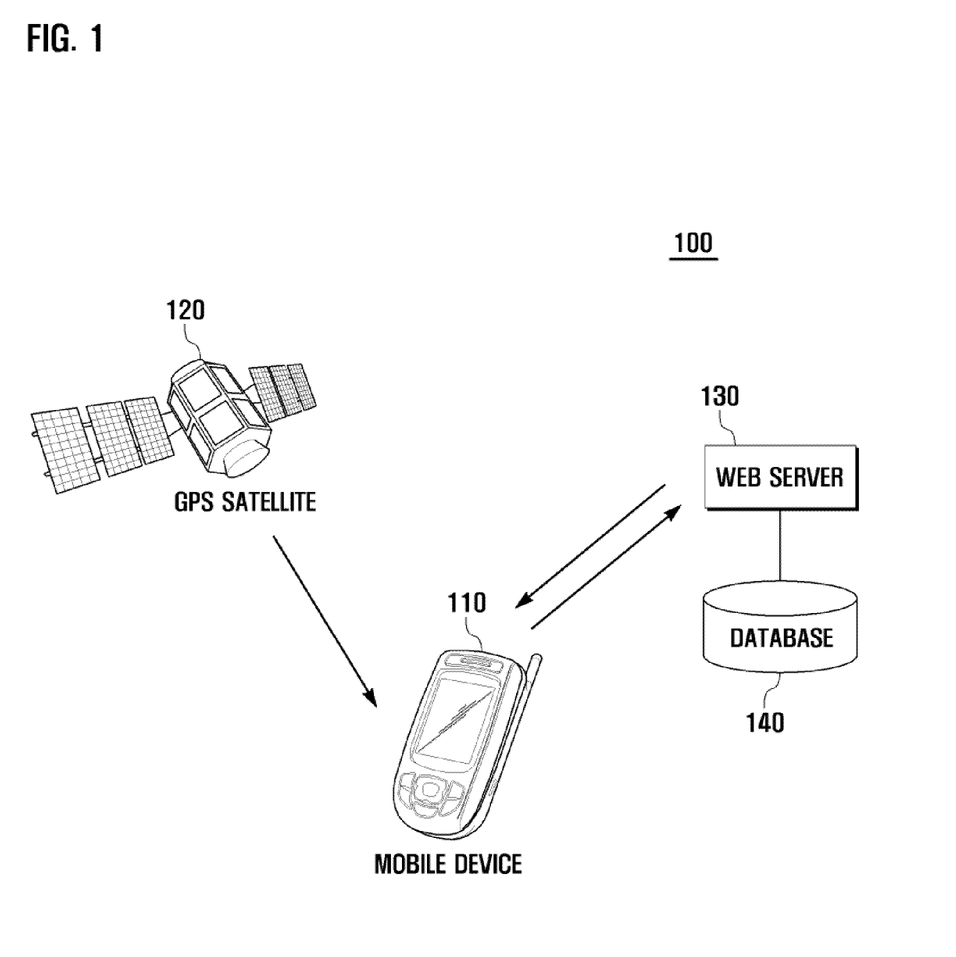
FIG. 1 is a schematic view illustrating a navigation service system using a mobile device according to an exemplary embodiment of the present invention.

FIG. 1 is a schematic view that illustrates a navigation service system using a mobile device according to an exemplary embodiment of the present invention.

Referring to FIG. 1, the navigation service system 100 includes a mobile device 110, a GPS satellite 120, a web server 130 and a database 140.

The mobile device 110 includes a GPS module and thereby receives location information of the mobile device from the GPS satellite 120. Also, the mobile device 110 accesses the web server 130 and then receives navigation data, such as maps and a list of candidate destinations from the web server 130.

The GPS satellite 120 transmits location information of the mobile device to the GPS module embedded in the mobile device.

The web server 130 provides navigation data, such as maps and a list of candidate destinations to the mobile device 110, being connected to the mobile device 110 through a wireless internet network, for example. Also, the web server 130 provides the Open API related to navigation data so that the mobile device 110 may use navigation data, such as maps and a list of candidate destinations.

The database 140 stores navigation data, including maps and a list of candidate destinations. The navigation data in the database 140 is provided to the mobile device 110 by the web server 130.

Figure 2:
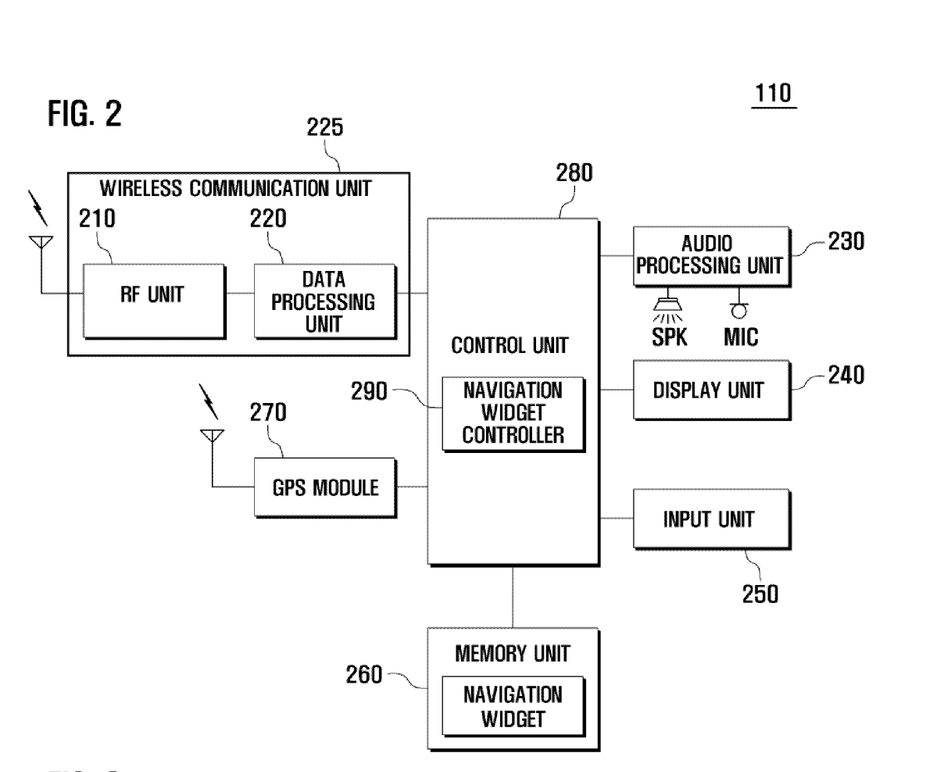
FIG. 2 is a block diagram illustrating a mobile device providing a navigation service according to an exemplary embodiment of the present invention.

FIG. 2 is a block diagram that illustrates a mobile device providing a navigation service according to an exemplary embodiment of the present invention.

Referring to FIGS. 1 and 2, the mobile device 110 includes a wireless communication unit 225, an audio processing unit 230, a display unit 240, an input unit 250, a memory unit 260, a GPS module 270 and a control unit 280.

The wireless communication unit 225 includes a Radio Frequency (RF) unit 210 and a data processing unit 220, both of which are elements to execute wireless communications for the mobile device 110. The RF unit 210 transmits and receives RF signals. Specifically, the RF unit 210 includes an RF transmitter (not illustrated) that up-converts the frequency of transmission signals and amplifies transmission signals, and an RF receiver (not illustrated) that down-converts the frequency of reception signals and low-noise amplifies reception signals. Although, not illustrated, the data processing unit 220 is composed of an encoder, a modulator, both of which are used for transmission signals, a decoder and a demodulator both of which are used for reception signals.

The audio processing unit 230, which includes a microphone and a speaker, performs functions of processing audio signals. The audio processing unit 230 may provide a navigation voice service to a user.

The display unit 240 displays various kinds of graphical information input by a user or offered to a user. The display unit 240 may be formed of an LCD and the like. Also, the display unit 240 may be formed with a touch screen, which performs portions or all of functions of the input unit 250. The display unit 240 displays map data in connection with the location of the mobile device 110 or the destination. Also, the display unit 240 displays the device location overlapped on the map data.

The input unit 250 may be formed of a keypad, a touchpad, and the like. The input unit 250 creates input signals based on user's manipulations and transmits the input signals to the control unit 280. For example, a user may execute a navigation program through the input unit 250.

The memory unit 260 stores user's information and a variety of programs required for operation of the mobile device 110. The memory unit 260 may store a navigation widget that corresponds to a specific application created using the Open API that the web server 130 provides.

The GPS module 270 receives GPS satellite signals including location information of the mobile device 110 from the GPS satellite 120 and transmits the satellite signals to the control unit 280.

The control unit 280 provides control signals required for entire operations of the mobile device 110. More particularly, the control unit 280 includes a navigation widget controller 290 for the control of the navigation service system.

The navigation widget controller 290 controls the wireless communication unit 225 through activation of a navigation widget so that the wireless communication unit 225 may receive map data and a list of candidate destinations from the web server 130. Also, the navigation widget controller 290 controls the GPS module 270 through activation of a navigation widget so that the GPS module 270 may receive location information of the mobile device 110 from the GPS satellite 120. The navigation widget controller 290 further controls the display unit 240 through activation of a navigation widget so that the display unit 240 may display map data and a device location.

Figure 3:
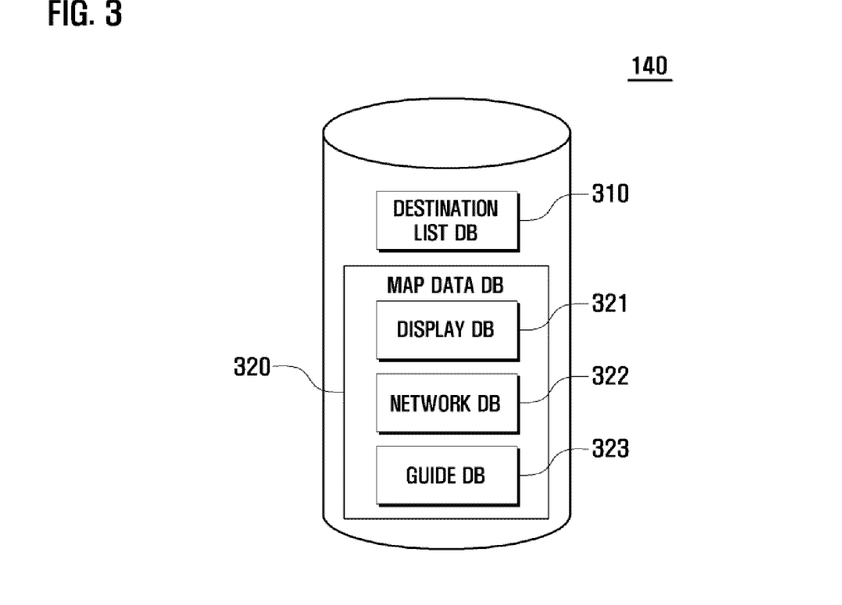
FIG. 3 is a schematic view illustrating a configuration of a database according to an exemplary embodiment of the present invention.

FIG. 3 is a schematic view that illustrates a configuration of a database according to an exemplary embodiment of the present invention.

Referring to FIGS. 1 to 3, the DataBase (DB) 140 includes a destination list DB 310 and a map data DB 320. Additionally, the map data DB 320 has a display DB 321, a network DB 322 and a guide DB 323.

The destination list DB 310 stores a list of addresses in connection with destinations (including domestic and foreign countries). When a user requests a destination list to the web server 130 by inputting a destination search keyword, the web server 130 retrieves a list of candidate destinations in connection with the keyword input from the destination list DB 310 and transmits the list to the mobile device 110.

The map data DB 320 stores map image data that will be displayed on the display unit 240 of the mobile device 110. The display DB 321, the network DB 322 and the guide DB 323 in the map data DB 320 stores display format data, road line data and route guidance data, respectively.

Figure 4:
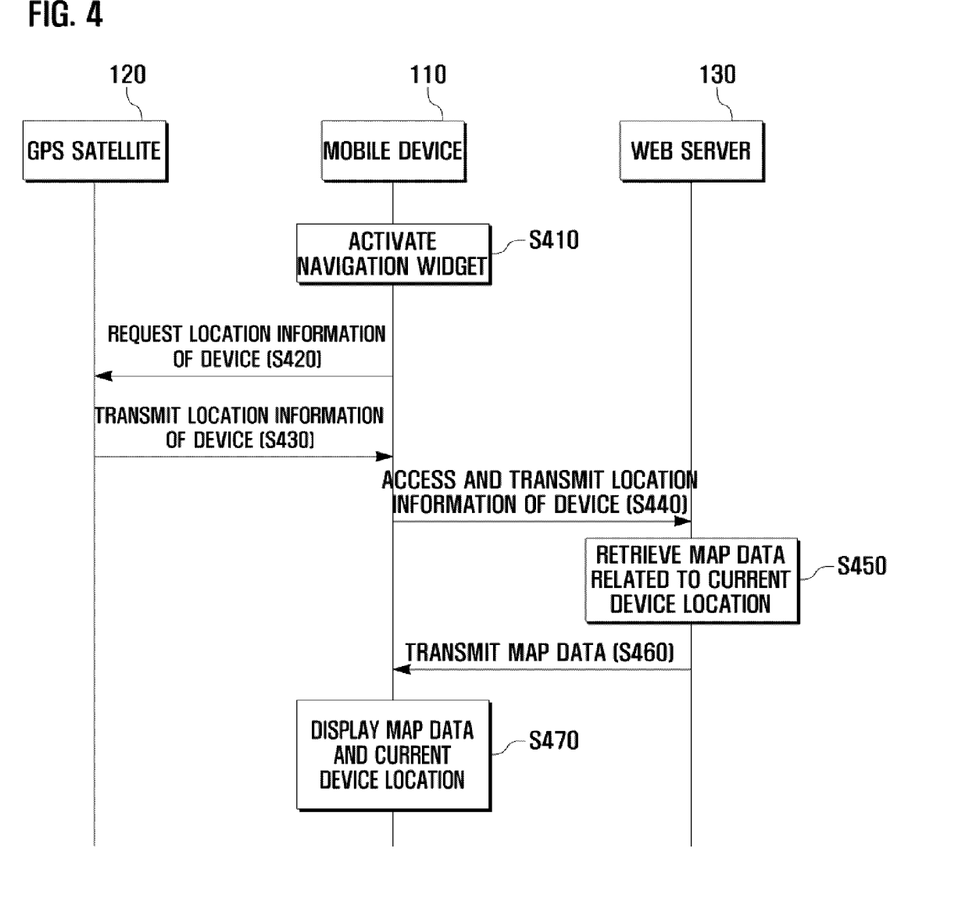
FIG. 4 is a flow diagram illustrating a process for displaying map data based on current location information of a mobile device according to an exemplary embodiment of the present invention.

FIG. 4 is a flow diagram illustrating a process for displaying map data based on current location information of a mobile device according to an exemplary embodiment of the present invention.

In an exemplary implementation, the mobile device 110 has a navigation widget stored therein, and the navigation widget controller 290 embedded therein. The navigation widget and the navigation widget controller 290 may be equipped in the mobile device before launching or may be installed in the mobile device through a download.

Referring to FIGS. 1 to 4, the navigation widget controller 290 of the mobile device 110 activates the navigation widget in step S410 in response to a user's manipulation of a navigation widget icon which is displayed on the display unit 240 in a standby state. If the navigation widget is embedded in the mobile device, the navigation widget icon may appear in a standby screen through a user's menu selection. If the navigation widget is downloaded from the web server, the navigation widget icon may appear in a standby screen automatically or through a user's menu selection.

Figure 6A:
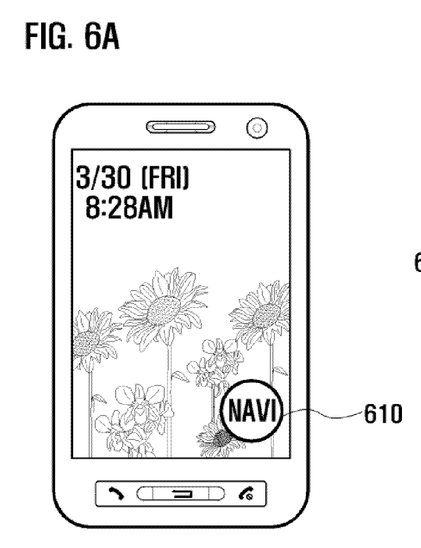
FIG. 6A is an exemplary view illustrating a navigation widget icon displayed in a standby screen according to an exemplary embodiment of the present invention.

FIG. 6A is an exemplary view illustrating a navigation widget icon displayed in a standby screen according to an exemplary embodiment of the present invention. As discussed above, the display unit 240 of the mobile device may be formed with a touch screen or an LCD.

Referring to FIG. 6A, if the mobile device is formed with a touch screen, the navigation widget is activated when a user touches the navigation widget icon 610 in a standby screen. If the mobile device is formed with an LCD, the navigation widget is activated when a user selects the navigation widget icon 610 through key input using the input unit 250. Additionally, a shortcut key may be established for activation of the widget.

Figure 6B:
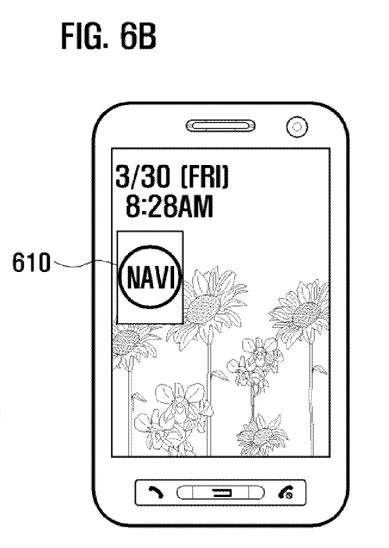
FIG. 6B is an exemplary view illustrating a navigation widget icon displayed in a standby screen according to an exemplary embodiment of the present invention.

FIG. 6B is an exemplary view illustrating a navigation widget icon displayed in a standby screen according to an exemplary embodiment of the present invention.

Referring to FIGS. 6A and 6B, the navigation widget icon 610 may be arranged at different positions in different shapes. A user may change the position of the navigation widget icon 610 through a drag action (in case of a touch screen) or by using key buttons (in case of an LCD). Also, the shape of the navigation widget icon 610 may vary with a user's selection.

Returning to FIG. 4, when the navigation widget is activated, the mobile device 110 requests information related to the current location of the mobile device 110 to the GPS satellite in step S420. The mobile device 110 then receives GPS satellite signals including information related to the device location from the GPS satellite 120 through the GPS module 270 in step S430. On receipt of GPS signals, the mobile device 110 accesses the web server 130 and transmits current location information of the mobile device 110 to the web server 130 through the wireless communication unit 225 in step S440. In response to location information of the mobile device 110, the web server 130 retrieves map data from the map DB 320 in step S450. The mobile device 110 then receives map data from the web server 130 through the wireless communication unit 225 in step S460, and displays the received map data and the current location of the mobile device 110 on the display unit 240 in step S470.

Figure 6C:
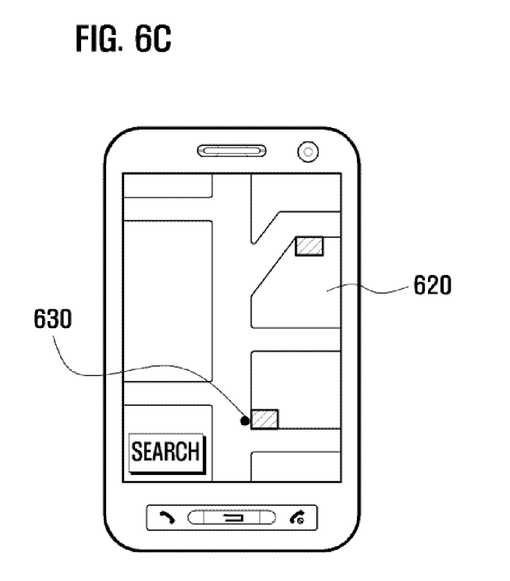
FIG. 6C is an exemplary view illustrating a map received from a web server and displayed on a display unit according to an exemplary embodiment of the present invention.

FIG. 6C is an exemplary view illustrating a map received from the web server and displayed on a display unit according to an exemplary embodiment of the present invention.

Referring to FIG. 6C, a map 620 related to the current location 630 of the mobile device 110 is received from the web server 130 and displayed on the display unit 240. Additionally, the current location 630 of the mobile device 110 is received from the GPS satellite 120 and overlapped with the map 620 displayed on the display unit 240.

Figure 6D:
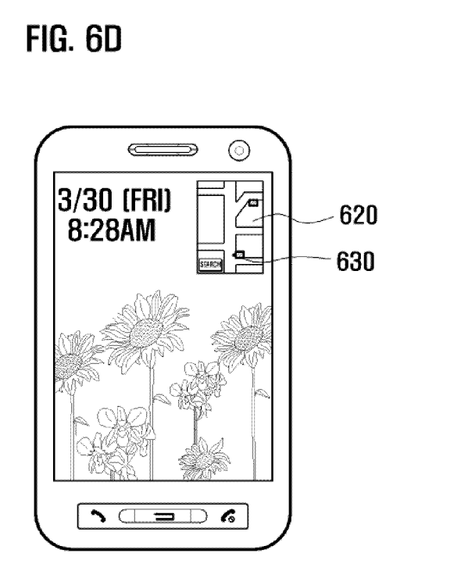
FIG. 6D is an exemplary view illustrating a map received from a web server and displayed on a display unit according to an exemplary embodiment of the present invention.

FIG. 6D is an exemplary view illustrating a map received from a web server and displayed on a display unit according to an exemplary embodiment of the present invention.

Referring to FIG. 6D, a map 620 has a scaled-down form and is arranged in a portion of a standby screen. When a user touches or selects the navigation widget icon 610 illustrated in FIGS. 6A and 6B, the icon 610 disappears and the map 620 appears at the position of the icon. The scaled-down form of the map 620 may be increased or decreased in size and moved through a drag action (in case of a touch screen) or by using key buttons (in case of an LCD without touchscreen capabilities).

However, the GPS satellite 120 begins to transmit information related to the current information of the mobile device 110 to the GPS module 270 in step S430, and continues such transmission in real time until the navigation widget is ended.

The navigation widget includes the Open API the web server 130 provides. Also, the navigation widget includes several instructions for the wireless communication unit 225 to receive a list of candidate destinations and related map data from the web server 130, for the GPS module 270 to receive device location information from the GPS satellite, and for the display unit 240 to display the device location on map data.

Figure 5:
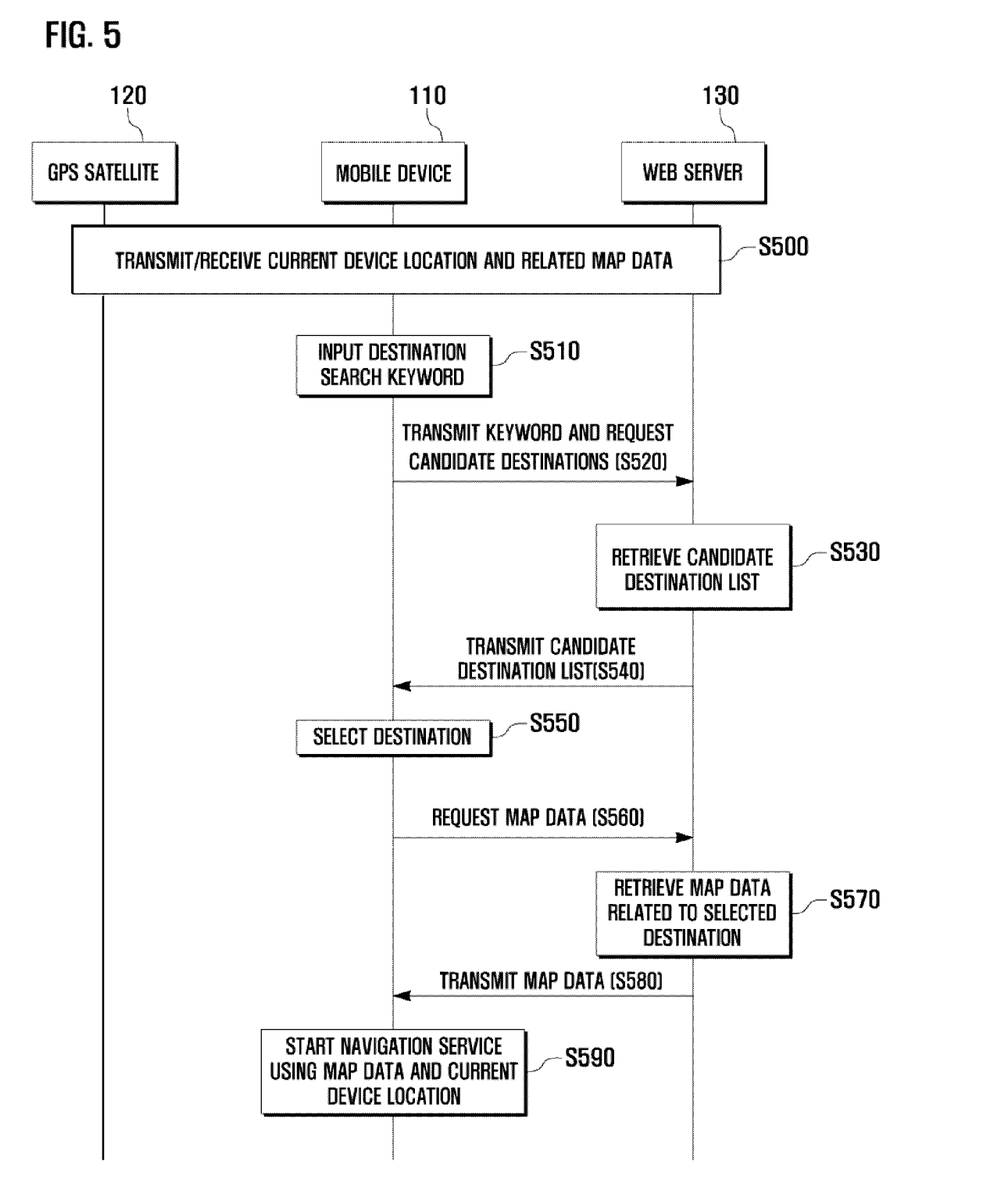
FIG. 5 is a flow diagram illustrating a process for displaying map data based on input of a destination search keyword input according to an exemplary embodiment of the present invention.

FIG. 5 is a flow diagram illustrating a process for displaying map data based on input of a destination search keyword according to an exemplary embodiment of the present invention.

Referring to FIG. 5, while the mobile device 110 receives current location information from the GPS satellite 120 and map data related to the current location from the web server 130 in step S500, a keyword for destination search is input through the input unit 250 of the mobile device 110 in step S510. The input of the destination search keyword may be performed while or before the GPS module 270 receives the current location of the mobile device 110 from the GPS satellite 120.

Figure 6E:
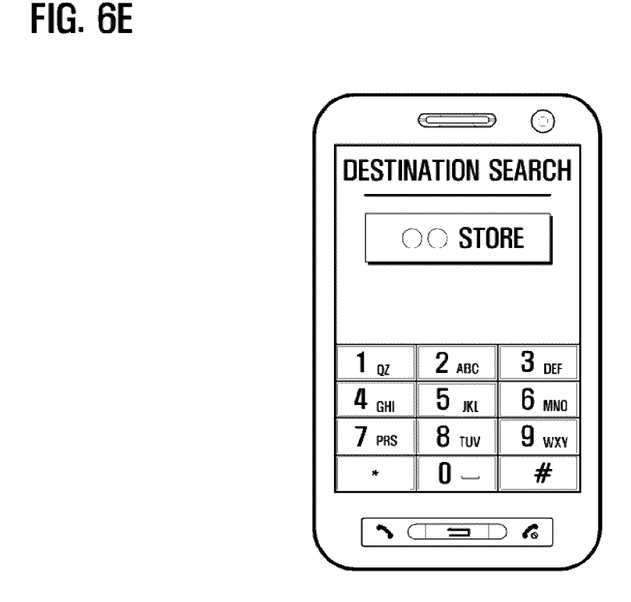
FIG. 6E is an exemplary view illustrating an input screen for a destination search according to an exemplary embodiment of the present invention.

FIG. 6E is an exemplary view illustrating an input screen for destination search according to an exemplary embodiment of the present invention.

Referring to FIG. 6E, when the map 620 is displayed with the current device location 630 as illustrated in FIG. 6C, a search icon 640 may also be displayed on the map 620. If the search icon 640 is touched or selected, a screen on the display unit is changed from the map 620 to the input screen for destination search illustrated in FIG. 6E. In an exemplary implementation, the input screen may appear immediately after the navigation widget is activated through a touch or selection of the navigation widget icon 610 as illustrated in FIGS. 6A and 6B. When the input screen is displayed, a user inputs a keyword (e.g., ○○ Store) for destination search through the input unit 250.

Returning to FIG. 5, when a keyword for destination search is input, the mobile device 110 transmits the keyword to the web server 130 to request candidate destinations related to the keyword in step S520. The web server 130 then retrieves a list of candidate destinations from the destination list DB 310 in step S530, and transmits the list to the mobile device 110 in step S540.

Figure 6F:
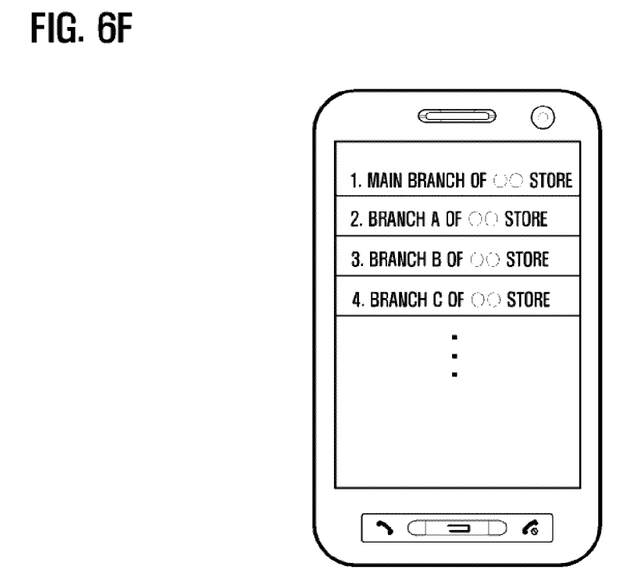
FIG. 6F is an exemplary view illustrating a list of candidate destinations according to an exemplary embodiment of the present invention.

FIG. 6F is an exemplary view illustrating a list of candidate destinations according to an exemplary embodiment of the present invention.

Referring to FIG. 6F, the mobile device 110 displays a list that includes several candidate destinations (e.g., a main branch of ○○ Store, a branch A of ○○ Store and the like) related to the keyword (e.g., ○○ Store).

Returning again to FIG. 5, a user selects one of the candidate destinations in the list in step S550, and the mobile device 110 transmits the selected destination to the web server 130 to request related map data in step S560.

The web server 130 retrieves map data related to the selected destination from the map data DB 320 in step S570, and transmits the map data to the mobile device 110 in step S580. The mobile device 110 starts a navigation service to the destination while displaying the map data and the current device location on the display unit 240 in step S590.

Figure 6G:
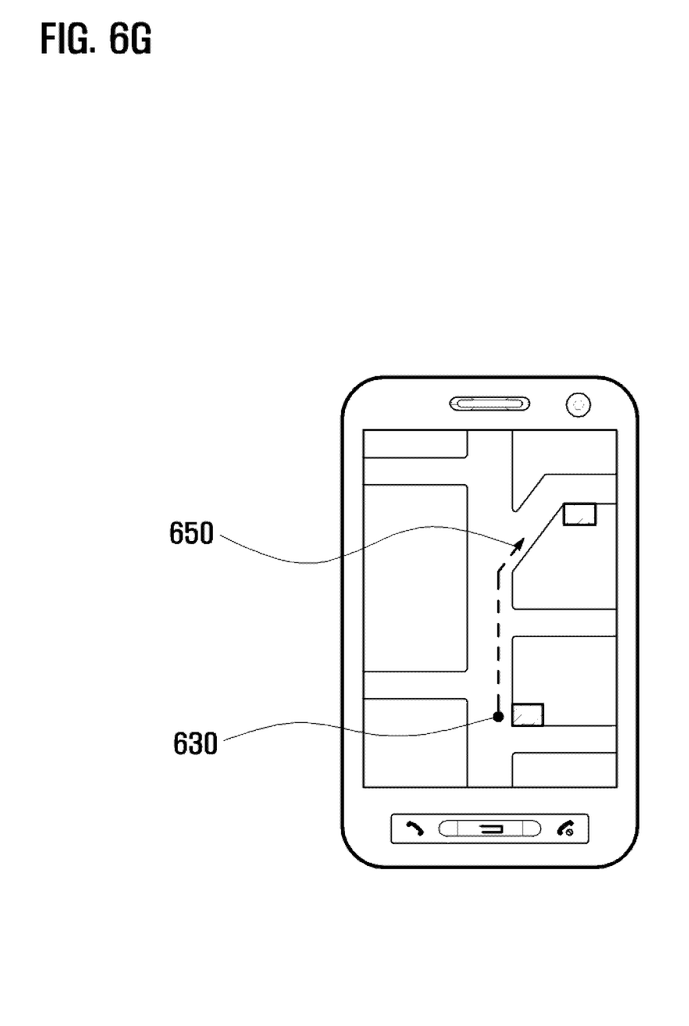
FIG. 6G is an exemplary view illustrating a navigation screen according to an exemplary embodiment of the present invention.

FIG. 6G is an exemplary view illustrating a navigation screen according to an exemplary embodiment of the present invention.

Referring to FIG. 6G, the mobile device 110 displays a current location of the mobile device 110 that is represented as a dot 630 in the map, and a guide path to the destination that is represented as a dotted line 650 in the map. During a navigation service, the mobile device 110 may further provide voice guidance through the speaker.

As described above, the navigation service system of exemplary embodiments of the present invention may provide a navigation service to a user of the mobile device without requiring a map-embedded mobile device. Therefore, updating map data is not required. Also, it is possible to easily use a navigation system in foreign countries.

Furthermore, the navigation service system may allow a user to reflect desired map data by redesigning a navigation program, thus implementing a wide selection of map data.

Additionally, the widget-based navigation program may reduce a loading time of the navigation service system.

While this invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A navigation service system, the system comprising:
a mobile device; and
a server for communicating with the mobile device,
the mobile device comprising:
 a display unit for displaying at least one navigation widget;
 a wireless communication unit for executing wireless communications with the server;
 a Global Positioning System (GPS) module for receiving location information of the mobile device;
 a memory unit for storing a navigation widget; and
 a navigation widget controller for controlling the wireless communication unit to transmit the location information of the mobile device to the server, for controlling the wireless communication unit to transmit to the server a search input text, for controlling the wireless communication unit to receive a list of at least one candidate locations from the server according to a search based on the search input text, for controlling the wireless communication unit to transmit to the server a request for map data of a destination selected from the received list of the at least one candidate locations, for controlling the wireless communication unit to receive map data of the selected destination from the server, and for controlling the display unit to display at least a portion of the received map data.

2. The system of claim 1, wherein the map data is related to the selected destination, and wherein the navigation widget controller controls the display unit to display the location information.

3. The system of claim 1, further comprising a database connected to the server for storing a list of destinations and the map data.

4. The system of claim 3, wherein the list of destinations in the database comprises a list of addresses in connection with destinations of the list of destinations.

5. The system of claim 1, wherein the map data comprise display format data, road line data and route guidance data.

6. The system of claim 1, wherein the navigation widget comprises an Open Application Programming Interface (API) which the server provides.

7. The system of claim 1, wherein the navigation widget comprises instructions for the GPS module to receive the location information of the mobile device from a GPS satellite, and instructions for the wireless communication unit to transmit the location information to the server.

8. The system of claim 1, wherein the navigation widget comprises instructions for the wireless communication unit to receive the list of the at least one of the candidate destinations and the map data from the server.

9. The system of claim 1, wherein the navigation widget comprises instructions for the display unit to display the location information on the map data.

10. The system of claim 1, wherein the navigation widget is activated by the navigation widget controller.

11. The system of claim 1, wherein the mobile device comprises an audio processing unit for providing a navigation voice service.

12. A navigation service method using a mobile device which comprises a Global Positioning System (GPS) module, a navigation widget controller, a wireless communication unit and a display unit, the method comprising:
 receiving location information of the mobile device through the GPS module controlled by the navigation widget controller;
 transmitting the location information of the mobile device to a server through the wireless communication unit controlled by the navigation widget controller;
 transmitting to the server a search input text;
 receiving a list of at least one candidate locations from the server according to a search based on the search input text through the wireless communication unit controlled by the navigation widget controller;
 transmitting to the server a request for map data of a destination selected from the received list of the at least one candidate locations;
 receiving the map data of the selected destination from the server; and
 displaying at least a portion of the received map data on the display unit controlled by the navigation widget controller.

13. The method of claim 12,
wherein the transmitting of the selected destination to the server is performed through the wireless communication unit controlled by the navigation widget controller, and
wherein the receiving of the map data related to the selected destination from the server and displaying of the location information on the display unit are controlled by the navigation widget controller.

14. The method of claim 13, wherein the location information and the map data are received when the navigation widget controller activates a navigation widget.

15. The method of claim 14, wherein the navigation widget comprises an Open Application Programming Interface (API) which the server provides.

16. The method of claim 12, wherein the map data comprise display format data, road line data and route guidance data.

* * * * *